(12) United States Patent
Huh

(10) Patent No.: US 6,227,230 B1
(45) Date of Patent: May 8, 2001

(54) LIQUEFIED PETROLEUM GAS TANK ASSEMBLY FOR VEHICLE

(75) Inventor: Jae-ho Huh, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/592,764

(22) Filed: Jun. 13, 2000

(30) Foreign Application Priority Data

Jun. 17, 1999 (KR) .................................... 99-22675

(51) Int. Cl.$^7$ ........................................................ B67D 5/00

(52) U.S. Cl. ........................ 137/265; 137/255; 137/571; 137/576

(58) Field of Search ..................................... 137/255, 265, 137/571, 572, 576

(56) References Cited

U.S. PATENT DOCUMENTS

| | | | |
|---|---|---|---|
| 2,384,677 | * 9/1945 | Hill | ........................................ 137/265 |
| 3,710,809 | * 1/1973 | Brown et al. | ..................... 137/571 X |
| 5,615,702 | * 4/1997 | Dawans et al. | ....................... 137/255 |

* cited by examiner

*Primary Examiner*—Kevin Lee

(57) ABSTRACT

Disclosed is a liquefied petroleum gas (LPG) tank assembly for a vehicle. A plurality of LPG tanks are communicated one with another through liquid-phase and gas-phase communication pipes and are secured one to another by connection brackets. A plurality of mounting brackets are fastened at one ends thereof to one ends of the plurality of LPG tanks, respectively, and at the other ends thereof to a body of the vehicle, thereby to prevent the connection brackets and the communication pipes from being damaged or broken due to vibration or impact which is generated in or exerted to the vehicle.

5 Claims, 3 Drawing Sheets

LIQUEFIED PETROLEUM GAS TANK ASSEMBLY FOR VEHICLE

BACKGROUND OF THE INVENTION

1. Field of the Invention

The present invention relates to a liquefied petroleum gas (LPG) tank assembly for a vehicle, and more particularly, the present invention relates to a liquefied petroleum gas tank assembly for a vehicle, which is able to solve the following two major problems that conventional LPG tanks have. One is induced in the conventional art in association with a height of the vehicle body from the ground when it is mounted to the undercarriage of a vehicle body. The other is possibility that a passenger compartment can be polluted with LPG when disposed in a trunk room.

2. Description of the Related Art

In a motor vehicle which uses LPG as fuel, a fuel tank for storing LPG is conventionally manufactured in a manner such that it has a cylindrical structure while meeting standard requirements. When the LPG tank is mounted to a passenger car, it is generally disposed in a trunk room. Also, in the case of a bus or a commercial vehicle, the LPG tank is secured to the undercarriage of a vehicle body.

Describing a structure of an LPG tank assembly for a vehicle, as shown in FIG. 5, an LPG tank is fabricated by welding a copper plate and a thin steel plate with each other to have a thickness on the order of 2.6–3.6 mm. A fuel charging valve 108, a liquid-phase valve 105 and a gas-phase valve 106 are arranged at a side of the LPG tank assembly 101. Also, a fuel gauge 107 and other attachments 109 are provided to the LPG tank assembly 101.

However, the conventional LPG tank assembly constructed as mentioned above suffers from defects in that, because the LPG tank assembly includes only one LPG tank, it is difficult to secure a sufficient amount of LPG which can enable the vehicle to run over a predetermined distance. Furthermore, in the case that the LPG tank assembly is installed in a limited space such as a trunk room, space utilization efficiency in a vehicle is deteriorated, and, in the case that the LPG tank assembly is installed on the undercarriage of the vehicle body, there exists a possibility that a problem is induced in association with a height of the vehicle body from the ground.

SUMMARY OF THE INVENTION

Accordingly, the present invention has been made in an effort to solve the problems occurring in the related art, and an object of the present invention is to provide a liquefied petroleum gas tank assembly for a vehicle, which improves mountability of LPG tanks to a vehicle body and at the same time, allows a sufficient amount of LPG to be secured.

In order to achieve the above object, according to the present invention, there is provided a liquefied petroleum gas (LPG) tank assembly for a vehicle, wherein two or three LPG tanks are communicated one with another through liquid-phase and gas-phase communication pipes and are secured one to another by connection brackets, and mounting brackets are fastened at one ends thereof to one ends of the LPG tanks, respectively, and at the other ends thereof to a body of the vehicle, thereby to prevent the connection brackets and the communication pipes from being damaged or broken due to vibration or impact which is generated in or exerted to the vehicle.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
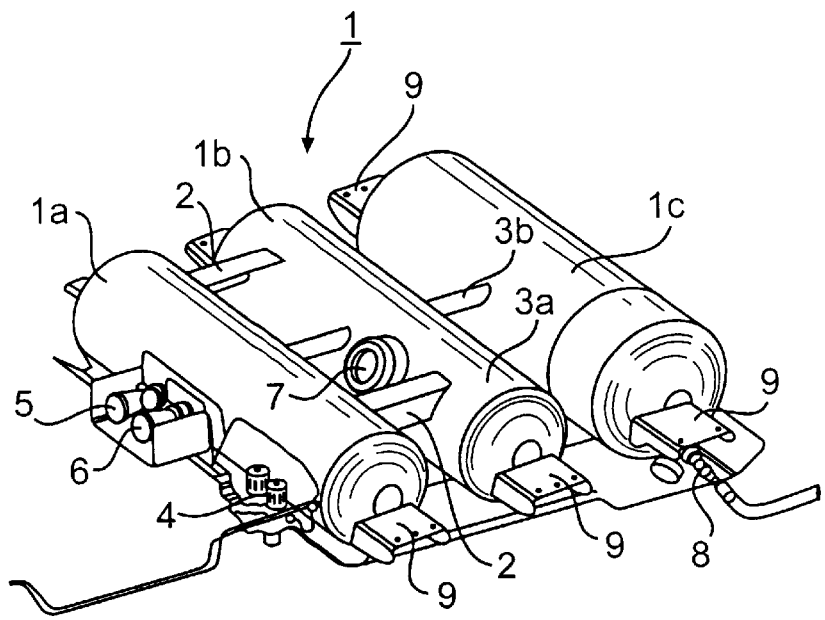
FIG. 1 is a perspective view illustrating an LPG tank assembly for a vehicle, which includes three LPG tanks, in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a perspective view illustrating an LPG tank assembly for a vehicle, in accordance with an embodiment of the present invention. While it is illustrated in FIG. 1 that the LPG tank assembly according to this embodiment of the present invention includes three LPG tanks, the present invention is not limited to this arrangement of the LPG tank assembly. Therefore, the LPG tank assembly of the present invention can have a multiple tank structure, as occasion demands. In this respect, it is preferred that the LPG tank assembly of the present invention includes two or three LPG tanks.

In this embodiment, three LPG tanks 1a, 1b and 1c are arranged parallel one to another. The LPG tanks 1a, 1b and 1c are secured one to another by connection brackets 2, and are communicated one with another through liquid-phase communication pipes 3a and gas-phase communication pipes 3b. While it is illustrated in FIG. 1 that three LPG tanks 1a, 1b and 1c are arranged parallel one to another, persons skilled in the art will readily appreciate that three LPG tanks 1a, 1b and 1c can be arranged alternatively in line with another.

Figure 2:
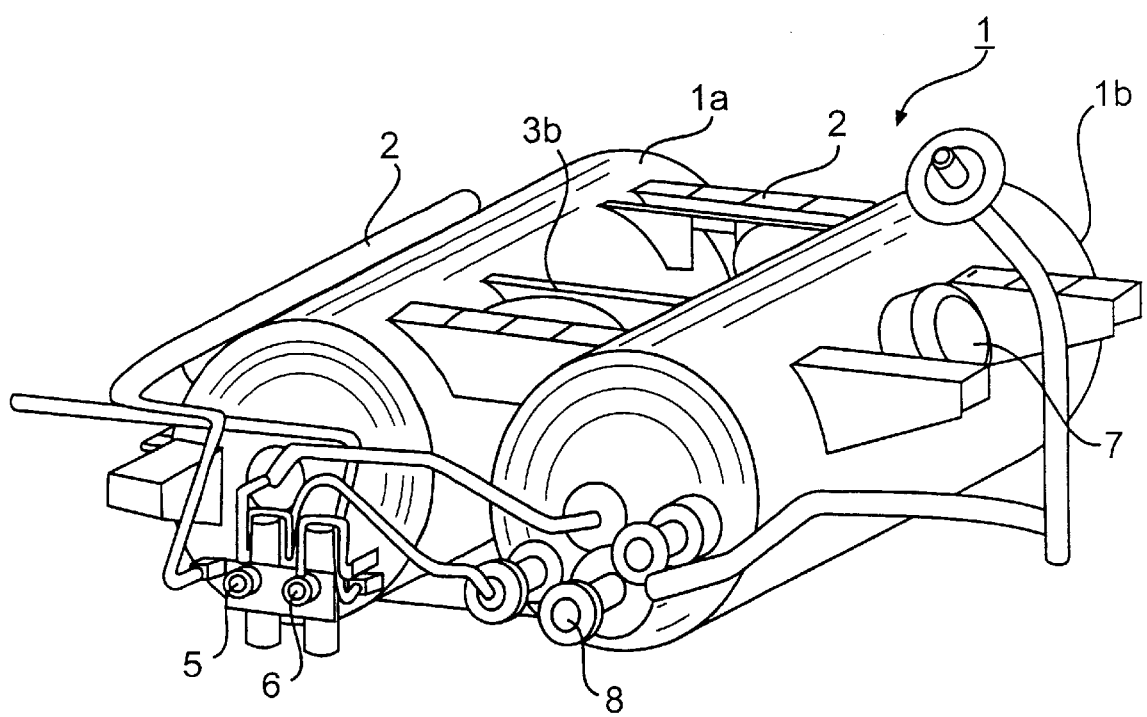
FIG. 2 is a perspective view illustrating another LPG tank assembly for a vehicle, which includes two LPG tanks, in accordance with another embodiment of the present invention.

FIG. 2 is a perspective view illustrating another LPG tank assembly 1 for a vehicle, which includes two LPG tanks 1a and 1b, in accordance with another embodiment of the present invention. In this embodiment, the same drawing reference numerals are used to designate the same parts as in the first embodiment. As in the first embodiment, the two LPG tanks 1a and 1b of this embodiment are secured to each other by connection brackets 2, and are communicated with each other through the liquid-phase communication pipe 3a and the gas-phase communication pipe 3b.

Figure 3:
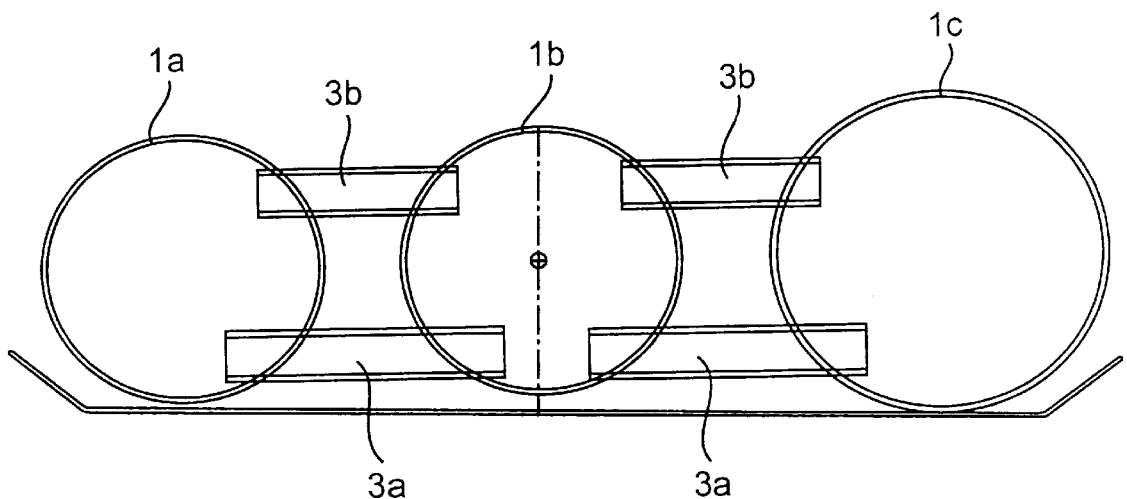
FIG. 3 is a cross-sectional view taken along the line I—I of FIG. 1.
Figure 4:
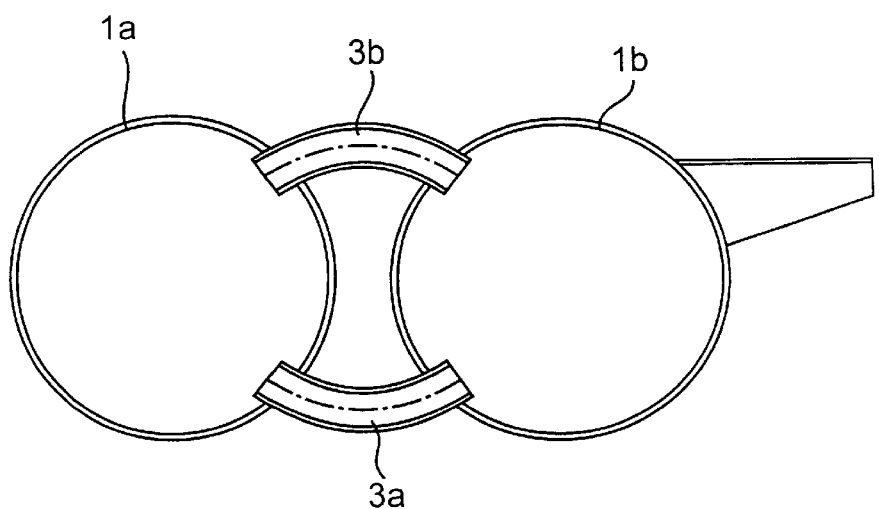
FIG. 4 is a cross-sectional view taken along the line II—II of FIG. 2.
Figure 5:
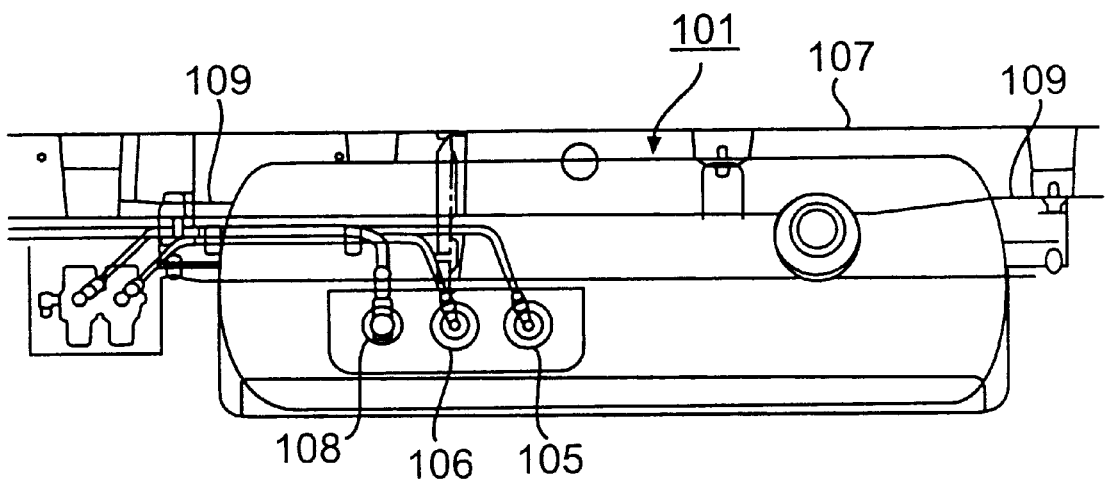
FIG. 5 is a side view illustrating a conventional LPG tank for a vehicle.

Further, in the present invention, as shown in FIG. 1, mounting brackets 9 are fastened at one ends thereof to one ends of the LPG tanks 1a, 1b and 1c, respectively, thereby to prevent the connection brackets 2 which secure the LPG tanks 1a, 1b and 1c one to another, from being damaged or broken due to vibration or impact which is generated in or exerted to the vehicle. The other ends of the mounting brackets 9 are fastened to a body of the vehicle. As shown in FIGS. 3 and 4, the liquid-phase communication pipes 3a are arranged adjacent to lower ends of the LPG tanks, and the gas-phase communication pipes 3b are arranged adjacent to upper ends of the LPG tanks.

Moreover, while, in the present invention, the liquid-phase and gas-phase communication pipes 3a and 3b have a configuration of a straight pipe or a bent pipe, they can have a configuration of a corrugated pipe or be made of synthetic rubber to have a predetermined flexibility.

Further, as in the conventional LPG tank assembly, the LPG tank assembly 1 of the present invention is structured in a manner such that it has a liquid-phase valve 5, a gas-phase valve 6, a fuel charging valve 8, a fuel gauge 7, and a solenoid and filter section 4.

As described above, the LPG tank assembly for a vehicle according to the present invention, constructed as mentioned above, provides advantages in that, since respective LPG tanks are securely mounted to a body of the vehicle, it is possible to prevent the LPG tanks from being damaged or broken due to vibration or impact which is generated in or exerted to the vehicle as the vehicle runs. Also, because a plurality of LPG tanks are disposed in a manner such that they are communicated one with another, space utilization efficiency in the vehicle is enhanced, and it is possible to secure a sufficient amount of LPG.

On the other hand, as in the conventional art, since a liquid-phase valve and a gas-phase valve which are installed on the LPG tank assembly for a vehicle, are respectively connected to a solenoid and filter section, it is possible to supply refined LPG to an engine of the vehicle.

As a result, in the present invention, a plurality of LPG tanks can be designed in such a manner as to be arranged in diverse ways. Due to the fact that the plurality of LPG tanks can be mounted to the body of the vehicle outside a passenger compartment, it is possible to prevent the passenger compartment from being polluted with LPG, to solve the problem which is induced in association with a height of the vehicle body from the ground and to secure a sufficient amount of LPG.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquefied petroleum gas (LPG) tank assembly for a vehicle, the assembly possessing a cylindrical tank structure in such a manner as to allow LPG to be filled therein and having installed thereon a fuel charging valve, a liquid-phase valve, a gas-phase valve and a fuel gauge, the assembly comprising:

a plurality of LPG tanks communicated one with another through liquid-phase and gas-phase communication pipes and secured one to another by connection brackets.

2. The assembly as claimed in claim 1, wherein the liquid-phase communication pipes are arranged adjacent to lower ends of the plurality of LPG tanks, and the gas-phase communication pipes are arranged adjacent to upper ends of the plurality of LPG tanks.

3. The assembly as claimed in claim 1, wherein the liquid-phase and gas-phase communication pipes have a configuration of a straight pipe or a bent pipe.

4. The assembly as claimed in claim 1, wherein the liquid-phase and gas-phase communication pipes are made of synthetic rubber to have a predetermined flexibility.

5. The assembly as claimed in claim 1, wherein a plurality of mounting brackets that are attached to a body of the vehicle are fastened at both ends of all the LPG tanks, thereby to prevent the connection brackets and the communication pipes from being damaged or broken.

* * * * *